United States Patent
Bayart

(10) Patent No.: US 6,532,104 B1
(45) Date of Patent: Mar. 11, 2003

(54) C-BAND AND L-BAND OPTICAL AMPLIFIER FOR SUBMARINE TRANSMISSION SYSTEMS

(75) Inventor: Dominique Bayart, Clamart (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/914,064
(22) PCT Filed: Dec. 21, 2000
(86) PCT No.: PCT/FR00/03638
§ 371 (c)(1), (2), (4) Date: Aug. 22, 2001
(87) PCT Pub. No.: WO01/48877
PCT Pub. Date: Jul. 5, 2001

(30) Foreign Application Priority Data

Dec. 23, 1999 (FR) .............................................. 99 16337

(51) Int. Cl.⁷ ................................................ H01S 3/00
(52) U.S. Cl. .................. 359/337.4; 359/349; 359/341.1
(58) Field of Search .......................... 359/337.4, 341.1, 359/341.3, 349

(56) References Cited

U.S. PATENT DOCUMENTS 6,049,418 A * 4/2000 Srivastava et al. .......... 359/341
6,104,527 A * 8/2000 Yang ........................... 359/341

FOREIGN PATENT DOCUMENTS

EP 0 883 218 A 12/1998
JP 02001044546 A * 2/2001

OTHER PUBLICATIONS

Patent Abstracts of Japan, vol. 1998, No. 04, Mar. 31, 1998 corresponding to JP 09 312432–A (Hitachi Cable Ltd) dated Dec. 2, 1997.
Y. Sugaya et al, "In–service–upgradable and wide–dynamic–range split–band optical fibre amplifier for high–capacity broadband WDM transmission systems" Electronics Letters, Aug. 5, 1999, IEE, UK, vol. 35, No. 16, pp. 1361–1362.

* cited by examiner

Primary Examiner—Mark Hellner
(74) Attorney, Agent, or Firm—Sughrue Mion, PLLC

(57) ABSTRACT

The invention proposes an optical amplifier for the C and L bands having a first stage with an amplification fiber (8) common to the C and L bands, a second stage with a branch (14) for C-band signals and a branch (12) for L-band signals with an amplification fiber (20). According to the invention, most of the power in the C band is created in the common amplification stage. The amplifier has a coupler (24) in the branch for C-band signals coupling pumping light for the amplification fiber of the first stage in the contrapropagating direction.

The invention simplifies the structure of the amplifier and limits the number of devices through which L-band signals pass after they are amplified in the common amplification fiber of the first stage. It improves the L-band signal/noise ratio.

14 Claims, 1 Drawing Sheet

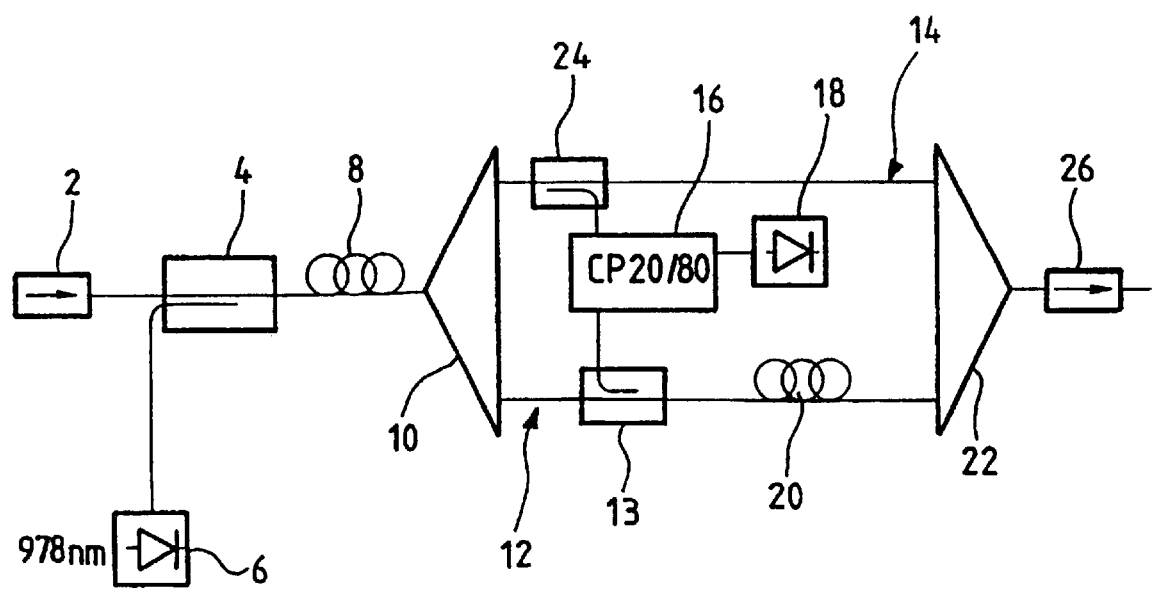

C-BAND AND L-BAND OPTICAL AMPLIFIER FOR SUBMARINE TRANSMISSION SYSTEMS

BACKGROUND OF THE INVENTION

The present invention relates to fiber optic transmission and more particularly to C-band and L-band amplifiers used for submarine transmission systems.

Fiber optic transmission systems use various bands, especially terrestrial transmission systems. The expression "C band" refers to the range of wavelengths from 1529 to 1565 nm and the term "L band" refers to the range of wavelengths from 1569 to 1603 nm. More generally, different values, beyond 1565 nm, can be considered for the L band, over a bandwidth of the order of 30 or 35 nm.

M. X. Ma et al, "765 Gbyte/s over 2,000 km Transmission using C- and L-band Erbium Doped Fiber Amplifiers", OFC'99, post-deadline paper PD16-1 to 3 describes a transmission experiment in the C and L bands for submarine transmission systems with 43.5 km sections and optical amplifiers. Each amplifier consists of a band splitter, separate amplification branches for the C and L bands, and a band combiner.

Y. Sun et al, "A gain-flattened ultra wide band EDFA for high capacity WDM optical communications systems", ECOC'98, pp. 53–54 proposes, for a terrestrial fiber optic transmission system, a very wide band optical amplifier for amplifying signals in the C and L bands. The amplifier has a first amplification stage with a fiber in which the C-band and L-band signals are amplified conjointly by contrapropagating light at 980 nm. The C-band and L-band signals are then split and amplified separately in two separate branches; each branch has three amplification stages to compensate the effects of the dispersion compensating fiber (DCF), to compensate the losses of the gain equalization filters, and to amplify the signals to the output power. For an input power of 0 dBm, the total gain of the amplifier is 25 dB. Approximately a quarter of the power created in the C band in the amplifier is created in the first amplification stage and three quarters are created in the branch for the C-band signals of the second stage.

SUMMARY OF THE INVENTION

The subject matter of the invention is amplification of C-band and L-band signals for submarine transmission systems; in such systems the amplifier input power is relatively high but the gain is moderate—the article previously cited by M. X. Ma proposes a value of 7 dBm for the input power and a value of 11.7 dB for the gain.

To be more precise, the invention proposes an optical amplifier for the C and L bands, having a first stage with an amplification fiber common to the C and L bands, a second stage with a branch for C-band signals and a branch for L-band signals with an amplification fiber, in which most of the power created in the C band is created in the first amplification stage.

The ratio between the output power in mW of the first stage for C-band signals and the output power mW of the amplifier for C-band signals is preferably greater than 0.50 and preferably greater than 0.75.

The gain of the amplifier for C-band signals is advantageously equal to the amplification gain for C-band signals in the first amplification stage.

The amplifier preferably has a gain less than 15 dB.

In one embodiment the amplifier has a coupler in the branch for C-band signals coupling pumping light for the amplification fiber of the first stage in the contrapropagating direction. The pumping light can have a wavelength from 1450 to 1500 nm.

There can be a coupler in the first stage for coupling second pumping light for the amplification fiber of the first stage. The second pumping light can have a wavelength from 965 to 990 nm.

Another embodiment of the amplifier has a coupler in the branch for L-band signals coupling pumping light for the amplification fiber of said branch.

In this case, it advantageously has a pump for supplying pumping light to the coupler in the branch for C-band signals and to the coupler in the branch for L-band signals.

The invention also relates to a fiber optic transmission system including at least one such amplifier.

BRIEF DESCRIPTION OF THE DRAWINGS

Other features and advantages of the invention will become apparent on reading the following description of embodiments of the invention, which is given by way of example and with reference to the accompanying drawings, the single figure of which is a diagrammatic representation of an amplifier in accordance with the invention.

DETAILED DESCRIPTION OF THE INVENTION

The invention proposes a C-band and L-band amplifier which has two amplification stages: the first stage is common to the C and L bands and includes an amplification fiber in which the signals of both bands are amplified. The second stage has one branch for C-band signals and one branch for L-band signals. In accordance with the invention, most of the power created in the C band in the amplifier is created in the first stage. The branch of the second stage for the C-band signals can therefore be simpler than in prior art amplifiers; in the example given below, there is no amplification of signals in this branch.

A new problem can also arise in the L band with this kind of amplifier; in fact, the length of the common fiber of the first amplification stage and the pump power can be adapted to provide the necessary gain in the C band or most of the power. The gain of the first stage in the C band is typically of the same order of magnitude as the losses over a section of the transmission system between two amplifiers, for example 12 dB. With this kind of gain, the amplification in the L band in the first amplification stage is low, and has a value of a few dB. The problem that would then arise is that of the increase in the noise factor in the L band when amplifying L-band signals in the second amplification stage. The invention also proposes a solution to this new problem; it proposes a simple and effective solution to the problem of reducing the noise factor in the L band without making the amplifier more complex.

To reduce the noise factor in the L band when amplifying signals in that band in the second amplification stage, in one embodiment of the invention the coupler for the contrapropagating light used for amplification in the fiber of the first stage is in the C-band signal branch of the second amplification stage. This limits the number of devices through which the L-band signals pass after amplification in the first stage. This improves the signal/noise ratio of the amplifier in the L band. The invention exploits the fact that pumping light can pass through a demultiplexer at the same time as C-band signals.

The figure is a diagrammatic representation of the amplifier of the invention. Referred to the signal propagation direction, the amplifier has an isolator 2 at the input followed by a coupler 4. The coupler 4 couples light from a pump 6 that consists of a 58 mW, 978 nm laser in the signal propagation direction. A fiber 8 connected to the output of the coupler 4 conjointly amplifies C-band and L-band signals.

Downstream of the coupler 4 is a demultiplexer 10 which separates C-band signals from L-band signals and sends them to two respective branches. The branch 12 for L-band signals contains a coupler 13 for coupling light coming from a pump 18 via a coupler 16 in the copropagating direction. An L-band amplification fiber 20 is connected to the output of the coupler 13. Downstream of that fiber is a multiplexer 22 which combines the signals from the branch for L-band signals and from the branch for C-band signals.

The branch 14 for C-band signals includes a coupler 24 which couples light coming from the pump 18 via the coupler 16 in the contrapropagating direction. In the embodiment shown, the branch of the amplifier for C-band signals contains only this coupler.

Finally, there is an output isolator 26 downstream of the multiplexer 22.

The operation of the device shown in the figure is as follows. C-band and L-band signals are amplified in the first amplification stage, i.e. in the common fiber 8, using copropagating light from the pump 6 and contrapropagating light from the pump 18, which passes through the multiplexer 10 to reach the fiber 8.

In the second amplification stage L-band signals are amplified in the fiber 20 using copropagating light from the pump 18. C-band signals are not amplified in the second amplification stage. Amplified L-band signals and C-band signals are recombined at the output of the second stage.

The following numerical values can be used to implement the invention. The pump 6 is a 70 mW, 978 nm pump. The common amplification fiber 8 is an 18 m erbium-doped fiber.

The pump 18 is a 95 mW, 1480 nm pump. The wavelength of the pump 18 coming from the branch for C-band signals via the couplers 16 and 24 therefore passes through the multiplexer to reach the first amplification stage.

The coupler 16 is a 20/80 coupler, which couples a power of 18 mW into the branch for C-band signals in the contrapropagating direction. The coupler 16 couples a power of 68 mW into the branch for L-band signals in the copropagating direction. The fiber 20 is a 44 m erbium-doped fiber.

The multiplexer 10 is available off the shelf, for example a JDS WD1516CAL9564 component using a thin film interference filter technology. It passes the light from the pump at wavelengths from 1450 to 1500 nm from the branch for C-band signals to the first amplification stage.

In this kind of configuration, the C-band gain in the first amplification stage is sufficient to achieve the amplification gain necessary for that band. Gain values of the order of 10 to 15 dB can be achieved, and are typically necessary to compensate losses in the previous section of the transmission system. It is therefore not indispensable to provide amplification for C-band signals in the second stage.

In this embodiment of the invention, the power created in the C band in the first amplification stage is equal to 100% of the power created in that band by the amplifier, whereas the power created in the branch of the second stage for C-band signals is zero. All of the power created in the C band is therefore created in the first amplification stage.

Amplification could also be provided for C-band signals in the C-band branch of the second amplification stage. However, given the total gain necessary, it is possible in accordance with the invention for most of the power in the C band to be created in the first stage. The ratio of the output powers in mW of the first stage and of the amplifier, for C-band signals, makes it easy to determine where the power is created; in the example given above, the ratio is close to 1. According to the invention that ratio is greater than 0.5, preferably greater than 0.75; in other words, the power created in the amplifier for C-band signals is mostly created in the first amplification stage.

The invention simplifies the structure of the amplifier and limits the number of pumps.

Another problem can arise, as explained above, because L-band signals are weakly amplified in the first amplification stage. Typically, for a C-band gain of the order of 12 dB, the gain in the doped fiber of the first amplification stage can only be 2 or 3 dB at the highest wavelength of the L band, for a fiber of the type referred to above; the output power of the first stage for L-band signals is a few mW. The low values of the output power and the high values of the gain of the second stage can degrade the L-band signal/noise ratio. To limit this, the invention proposes to place the coupler for injecting the contrapropagating pumping light of the first amplification stage into the branch of the second amplification stage intended for the C band. In this way, the invention limits L-band signal losses after amplification in the common fiber; after the common amplification fiber, L-band signals pass through only the demultiplexer 10 before reaching the second amplification stage.

In the configuration proposed by way of example, the L-band gain in the first amplification stage is of the order of 3.1 dB for a wavelength of 1595 nm and the output power is of the order of 4 mW for all the L-band channels. In the second amplification stage the L-band gain is of the order of 8.5 dB at the wavelength of 1595 nm. Allowing for the insertion losses of the multiplexers, the total gain of the amplifier is of the order of 11 dB. By way of comparison, for insertion losses of the coupler 24 of the order of 0.5 dB, the L-band signal/noise ratio is improved by about 1 dB compared to a configuration with the coupler for contrapropagating light in the first amplification stage.

The power of the contrapropagating pump light at 1480 nm is reduced by its passage through the multiplexer 10, compared to a configuration with the coupler 24 in the first amplification stage; the corresponding losses are of the order of 0.3 dB and the penalty on the pump power is not diriment; it can be compensated by slightly increasing the pump power.

The invention can be implemented using optical components known to the skilled person. Thus the term "coupler" is a functional definition, and a multiplexer can be used as a coupler, or any other component for injecting the pump light into the amplification fiber. Similarly, diverse technical solutions can be used for the multiplexer and the demultiplexer, such as circulators and Bragg gratings. In this case, the circulator passes the signals from the first amplification stage to the branch for L-band signals and there is a Bragg grating to reflect C-band signals in the branch for L-band signals.

Of course, the present invention is not limited to the examples and embodiments described and shown, and is open to many variants that will suggest themselves to the skilled person. Thus the isolators are not essential to the operation of the amplifier. In the example shown in the figure, the coupler for the contrapropagating light for pumping the first stage is in the branch of the second stage for C-band signals; this coupler could be in the first stage, at the cost, where applicable, of degrading the L-band signal/noise ratio.

It is also obvious that the pump powers or wavelengths can be varied relative to the values given by way of example. The 978 nm pump con more generally have a wavelength from 965 to 990 nm. The pump at 1480 nm can have a wavelength from 1450 to 1500 nm; a wavelength in this range can pass through the demultiplexer 10 from the branch for C-band signals to reach the first amplification stage.

In the example, a single pump is used for contrapropagating pumping of the first stage and for copropagating pumping of the second stage of the amplifier, the coupler 16 splitting the power between the two pumping directions; separate pumps could also be used. Contrapropagating light could also be used in the second amplification stage to pump the amplification fiber. This solution would further increase the signal/noise ratio, in that it further reduces the number of devices that L-band signals have to pass through before reaching the amplification fiber of the second stage. Finally, in the example shown in the figure, two pumps are used for the first amplification stage. It would be possible to use only a contrapropagating pump coming from the second amplification stage, or to use a second contrapropagating pump.

What is claimed is:

1. An optical amplifier for the C and L bands, said optical amplifier comprising: a first stage with an amplification fiber common to the C and L bands, a second stage with a branch for C-band signals and a branch for L-band signals with an amplification fiber, wherein most of the power created in the C band is created in the first amplification stage.

2. The amplifier according to claim 1, wherein the ratio between the output power of the first stage for C-band signals and the output power of the amplifier for C-band signals is greater than 0.50.

3. The amplifier according to claim 1, characterized in that the gain of the amplifier for C-band signals is equal to the amplification gain for C-band signals in the first amplification stage.

4. The amplifier according to claim 1, characterized in that it has a gain less than 15 dB.

5. The amplifier according to claim 1, wherein a coupler in the branch for C-band signals couples pumping light for the amplification fiber of the first stage in the contrapropagating direction.

6. The amplifier according to claim 5, characterized in that said pumping light has a wavelength from 1450 to 1500 nm.

7. The amplifier according to claim 5 or, characterized in that it has a coupler (4) in the first stage coupling second pumping light for the amplification fiber of the first stage.

8. The amplifier according to claim 7, characterized in that the second pumping light has a wavelength from 965 to 990 nm.

9. The amplifier according to claim 5, characterized in that it has a coupler (13) in the branch (12) for L-band signals coupling pumping light for the amplification fiber (20) of said branch.

10. The amplifier according to claim 9, wherein said amplifier includes at least one pump supplying pumping light to the coupler in the branch for C-band signals and to the coupler in the branch for L-band signals.

11. A fiber optic transmission system including at least one amplifier according to claim 1.

12. The amplifier according to claim 2, wherein the ratio between the output power of the first stage for C-band signals and the output power of the amplifier for C-band signals is greater than 0.75.

13. The amplifier according to claim 10, wherein said at least one pump comprises a single pump supplying pumping light for both the L-branch and C-branch.

14. The amplifier according to claim 5, wherein contrapropagating pumping light from said second stage is the only pumping light in said first stage.

* * * * *